United States Patent [19]
Flippen

[11] Patent Number: 5,531,028
[45] Date of Patent: Jul. 2, 1996

[54] PRINTED SHEET MEASURING DEVICE

[76] Inventor: James Flippen, 55 Sand Harbor, Alameda, Calif. 94502

[21] Appl. No.: 341,351

[22] Filed: Nov. 16, 1994

[51] Int. Cl.[6] .................................................. G01B 3/10
[52] U.S. Cl. ............................. 33/1 B; 33/493; 33/758
[58] Field of Search ............................. 33/1 B, 483, 493, 33/755, 759, 760, 771, 758

[56] References Cited

U.S. PATENT DOCUMENTS

| | | | |
|---|---|---|---|
| 603,088 | 4/1898 | Kimball | 33/493 |
| 846,461 | 3/1907 | Engel | 33/755 |
| 1,212,279 | 1/1917 | Stone | 33/1 B |
| 2,742,705 | 4/1956 | Gelardi | 33/758 |
| 2,792,110 | 5/1957 | Wanish | 33/758 |
| 2,932,897 | 4/1960 | Huber | 33/758 |
| 3,797,120 | 3/1974 | Byne | 33/493 |
| 4,965,943 | 10/1990 | Adams | 33/759 |
| 5,076,612 | 12/1991 | Nirmel | 33/1 B |
| 5,406,716 | 4/1995 | Rubinstein | 33/760 |

FOREIGN PATENT DOCUMENTS

| 131001 | 6/1988 | Japan | 33/755 |
|---|---|---|---|

OTHER PUBLICATIONS

Applicant's Invention Disclosure Document No. 347385, filed in/U.S. P.T.O. Feb. 4, 1994.

L. L. Bean Christmas Catalog—entirety—1994.

*Primary Examiner*—Thomas B. Will
*Attorney, Agent, or Firm*—Ray K. Shahani

[57] ABSTRACT

An inexpensive tape measure which can be incorporated into mail order catalogs and the like for providing potential purchasers of clothing or accessories a measuring device for obtaining necessary dimensions for making size and product selections consisting essentially of a sheet of material with the dimension markings printed thereon, the sheet folded in such a manner as to permit the dimension markings to become aligned in an operative manner, an attachment flap which can attached to the opposing face of the folded sheet of printed material, and a plurality of lines of separation along which the material can be cut with a knife or scissors or along which perforations can be made, thus producing an elongated tape measure.

9 Claims, 3 Drawing Sheets

PRINTED SHEET MEASURING DEVICE

DISCLOSURE DOCUMENT

This invention was initially described and disclosed to the U.S. Patent and Trademark Office in Disclosure Document No. 374385, received Feb. 4, 1994, which is hereby expressly incorporated herein by reference.

RESERVATION OF COPYRIGHT

A portion of the disclosure of this patent document, including all accompanying drawings, contains material to which a claim of copyright protection is made. The copyright owner has no objection to the facsimile reproduction by anyone of the patent document or the patent disclosure, as it appears in the Patent and Trademark Office patent file or records once made public, for purposes other than for those expressly permitted under state and federal law pertaining to unauthorized reproduction of copyrighted materials and literary expression, but reserves all other rights whatsoever.

FIELD OF THE INVENTION

This invention relates generally to measuring devices, and more particularly to a preprinted, folded and assembled, inexpensive tape measure which can be incorporated into mail order catalogs and the like for providing potential purchasers of clothing or accessories a measuring device for obtaining necessary dimensions for making size and product selections.

BACKGROUND OF THE INVENTION

The prior art in this field is very extensive. There is a wide variety of described and available devices and methods for taking measurements of an individual's body parts. Perhaps the simplest and oldest of these devices is the standard cloth or plastic measuring tape used by tailors and clothing salespeople. Typically made out of a soft, flexible material which can be rolled into a small bundle or worn around one's neck, these typical tape measures have broad appeal mainly due to their low cost.

Other types of devices are available. These include tape measures which are retractable into a small housing, optionally comprising a locking mechanism, tape measures which are self-supporting in the extended position, tape measures with clips, straps and snaps for improving the convenience of use for particular applications, etc. A wide range of electronic tape measures with features such as electric eyes, electric counters, digital displays, etc. are also available. Numerous devices in combination with levels, magnets, T-squares, marking devices, scales or balances, compasses, magnifying glasses, flashlights, wrenches, screwdrivers, clipboards, lights or other methods for illumination, notepads, hooks, keychains, etc. are also described. Several of these previously described devices are intended for specific purposes or for use in particular applications, including carpentry, plumbing, fishing, mechanical work, sewing as well as clothing sales.

In spite of the great number of devices available on the market there is still no device which will allow a potential purchaser of clothing or other accessories from catalogs or other product information brochures and the like to take the necessary measurements without first having to locate a tape measure. While it may be true that many clothing salespeople or tailors would keep these devices handy and ready for use. However, the typical consumer of mail-order products is not likely to have a tape measure readily available to him or her at the time the individual is making a decision to purchase a product, and the consumer would therefore first have to locate a tape measure first before proceeding with the purchase. Often mail order catalog companies accept orders over the telephone or via a facsimile machine and this makes it very easy to place the order. Initially, though, the customer must know his or her dimensions or he or she must make the measurements, and if the individual does not happen to have a tape measure handy, the potential customer might decide not to make the purchase.

Finally, several catalogs come with inserts containing ordering information, size charts, shipping details and costs, etc. Occasionally one will see a mail order catalog with a measuring device for a specific function. For example, the applicant is aware of past use in mail order catalogs of an insert consisting of a set of drawings of children's feet on a form correlating the markings with specific children's foot sizes. However, since most catalogs are made of sheets of paper less than 8.5 inches by 11 inches, it is not practical to have an insert for shoe sizes much larger than for youth.

Thus it is apparent that there is no device or system available to general consumers of mail order catalogs which will provide the consumer with a readily available tape measure. While it is true that the publishers or distributors of these catalogs could include in the catalog or brochure a separate measuring device, this would add bulk, weight and cost to the catalog, the cost eventually being passed on to the consumer. Furthermore, it is likely that a large number of recipients of these types of catalogs discard them immediately upon receipt or eventually decide not to make any purchase at all, thus resulting in a waste of money and additional burden upon our environment in terms of increased generation of waste matter and increased consumption of natural resources.

Thus it would be desirable to provide an economical, environmentally friendly and convenient alternative to conventional tape measuring devices for enclosure along with a mail order catalog or other product information brochures, thus making the purchase of products in this manner more likely.

SUMMARY OF THE INVENTION

This invention is essentially a printed sheet measuring device which can be manufactured inexpensively and, optionally, inserted into sales brochures, mail order catalogs and the like for distributing an elongated tape measure. The device comprises a printed sheet of material, the printed sheet of material forming essentially a continuous loop of material having an outer surface and an inner surface. Lines of separation are indicated on the printed sheet of material and the lines of separation are essentially parallel to each other upon either the outer surface or the inner surface of the continuous loop of material such that the lines of separation align themselves along a continuous spiraling path upon either the outer surface or the inner surface of the continuous loop of material. A set of dimension markings are printed on the printed sheet of material and upon separation of the printed sheet of material along the lines of separation, a contiguous, elongated tape measure is produced.

The invention furthr comprises a plurality of folds in the printed sheet of material, the folds creating at least a first opposing portion of the printed sheet of material and a second opposing portion of the printed sheet of material. The folds also create an attachment flap for attaching the first opposing portion to the second opposing portion, thereby creating an essentially continuous loop of printed material.

The invention further comprises an insert flap, defined by another line of separation. The insert flap can be used for binding the printed sheet measuring device into a printed publication.

The lines of separation can be created by a plurality of printed markings on the printed sheet of material or can be created by a plurality of perforations on the printed sheet of material. The dimension markings correspond with predetermined standard, generally accepted measurement dimensions or can correspond with predetermined custom, specifically defined measurement dimensions.

A method of using a printed sheet measuring device which can be manufactured inexpensively and, optionally, inserted into sales brochures, mail order catalogs and the like for distributing an elongated tape measure is also disclosed. The method of use comprises the following steps: (a) removing the printed sheet measuring device from its source of distribution, generally a sales catalog or other printed, product information brochure; (b) dividing the printed sheet of material along lines of separation such that a contiguous, elongated tape measure is produced either by cutting the sheet of printed material along the lines of separation or by separating the printed sheet of material along perforated lines of separation; and (c) utilizing the elongated tape measure in a conventional manner.

A method of making an elongated measuring device which can be manufactured inexpensively and, optionally, inserted into sales brochures, mail order catalogs and the like for distributing the elongated tape measure is also disclosed. The method of making the elongated tape measure comprises the following steps: (a) obtaining a sheet of material; (b) printing thereon, in a predetermined pattern, a set of dimension markings; (c) indicating thereon, in a predetermined pattern, lines of separation; (d) folding the sheet of material such that the lines of separation align themselves along a continuous spiral; (e) providing thereon an attachment flap; and (e) attaching the attachment flap to the folded sheet of material such that a continuous loop of material is created, whereby when the sheet of material is separated long the lines of separation a contiguous, elongated tape measure is produced. The method could include printing the lines of separation upon the sheet of material or could include creating perforations along the lines of separation.

Numerous other advantages and features of the present invention will become readily apparent from the following detailed description of the invention and the embodiments thereof, from the claims and from the accompanying drawings in which the details of the invention are fully and completely disclosed as a part of this specification.

DETAILED DESCRIPTION OF THE INVENTION

Figure 1:
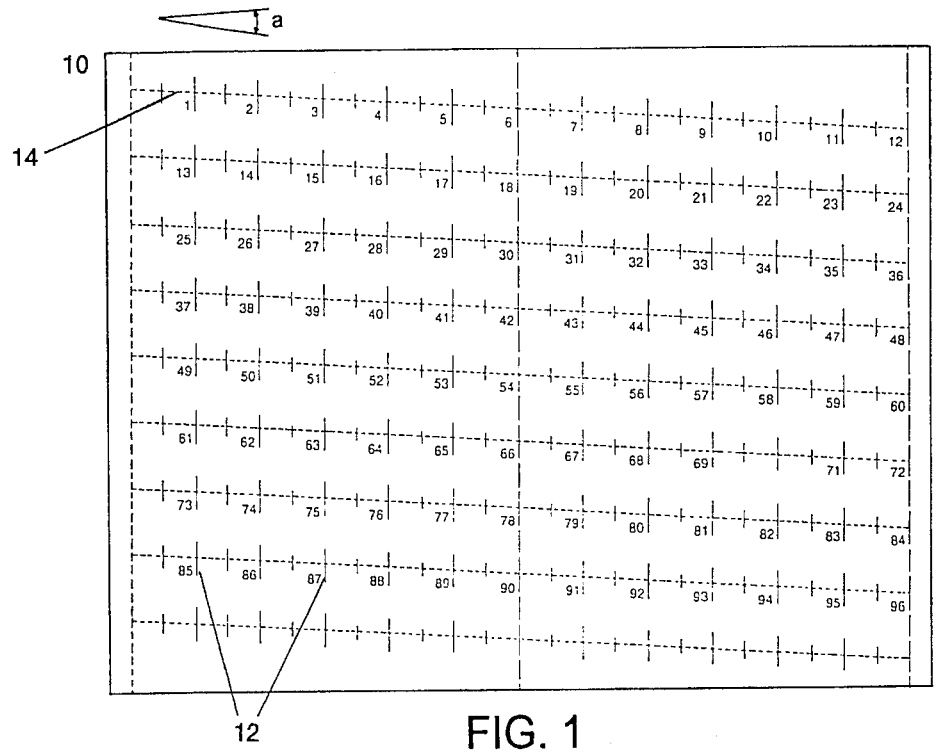
FIG. 1 is a top view of the present invention shown unfolded and unassembled.

FIG. 1 is a top view of the present invention shown unfolded and unassembled. The printed sheet measuring device 10 can be constructed out of a single piece of material. In a preferred embodiment the piece of material is square or rectangular, but other shapes are possible. A set of essentially horizontal dimension markings 12 are printed directly upon one or more sides of the material. These markings could indicate random or specific dimensions, such as shoe or hat sizes, or the markings could indicate predetermined or conventional lengths in units such as inches, feet, meters, or others. Other markings, such as logos, reference information such as conversion data, telephone numbers, etc. could also be present.

The piece of material used for the device also has lateral lines of separation 14 running essentially horizontally. The lateral lines of separation can be demarcated by a second set of printed markings or, preferably, by perforations. These lateral lines of separation indicate the points at which essentially transverse separations in the material will be produced, resulting in the elongated shape of the measuring device of the present invention. These lateral lines of separation run along essentially straight lines. When the piece of material is square or rectangular the lines might run at a slight angle a with respect to the square of the material. Thus, when the folds are made in the piece of material, the dimension markings become operatively aligned. It will be understood that the invention can be made with either lateral lines of separation markings or the perforations. In the former case, i.e. one with the lateral lines of separation markings, the user must cut the material along these lines with a pair of scissors in order to make and use the measuring device. Using perforations allows the user to separate the piece of material into an elongated strip without needing additional tools.

Figure 2:
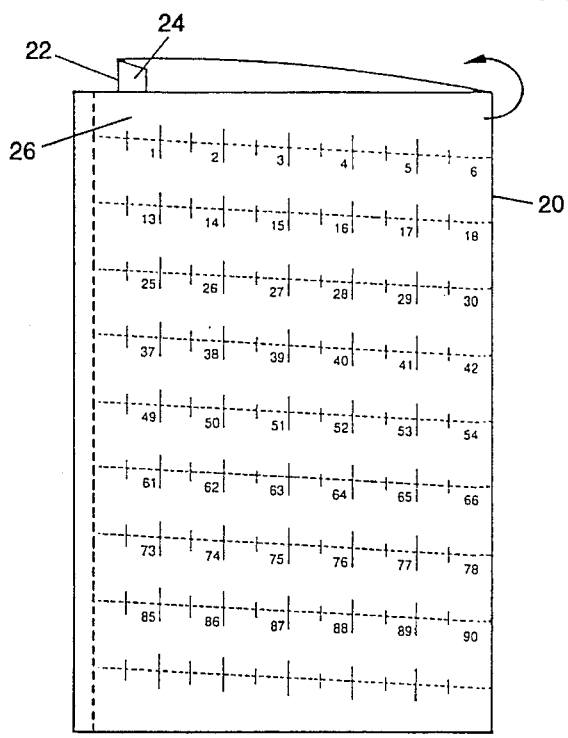
FIG. 2 is a perspective view of the present invention showing typical folding arrangements.

FIG. 2 is a perspective view of the present invention showing typical folding arrangements. The material is given a central fold 20 and an attachment fold 22, thus producing an attachment flap 24. When these two folds are made properly, the printed markings on either side of the piece of material will be aligned in an operative manner. This alignment is critical. The dimension markings become aligned to form a continuous set of markings essentially parallel to each other, as do the lateral lines of separation. The attachment flap can be attached to the inside surface 26 of the folded piece of material.

Figure 3:
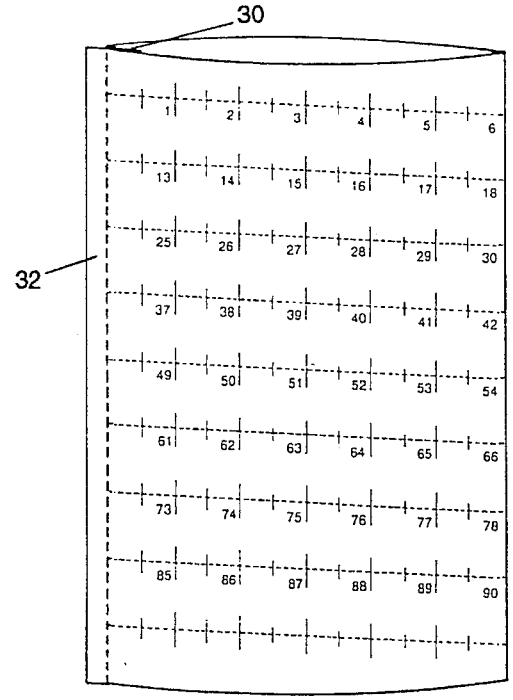
FIG. 3 is a perspective view of the present invention partially assembled.

FIG. 3 is a perspective view of the present invention assembled. The attachment flap can be attached to the inside surface at points 30 of the printed material by any means convenient and efficacious. Adhesives, staples, tape, thermal bonding, etc. are but a few of the many possibilities for effecting this attachment and others will be obvious to those skilled in the art. An insert flap 32 can be provided. Typically this flap would not contain any dimension markings. Its purpose, as will become apparent, is to provide a means for inserting or binding the invention into catalogs or brochures, etc.

Figure 4:
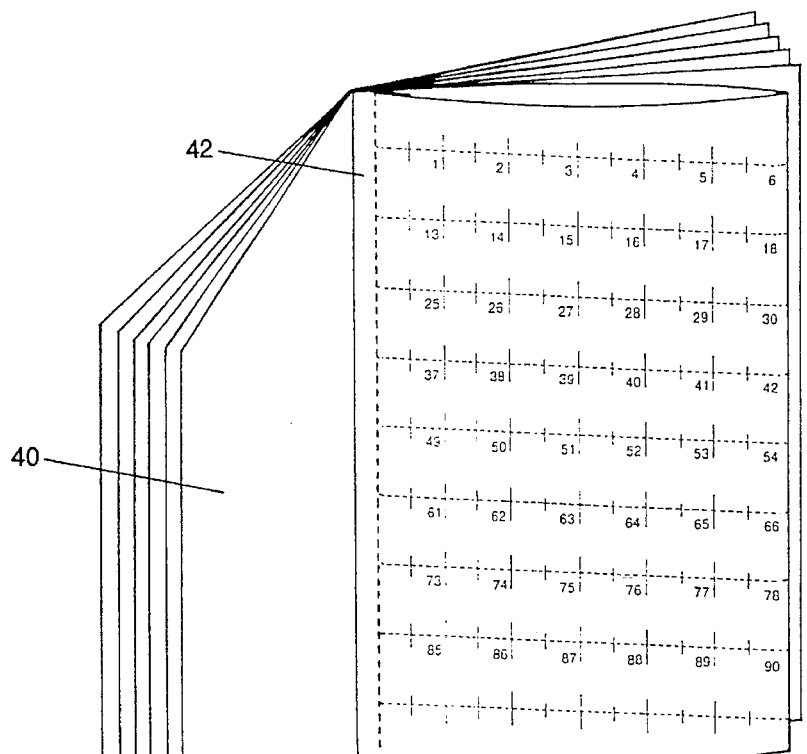
FIG. 4 is a perspective view of the present invention fully assembled and inserted into a printed publication.

FIG. 4 is a perspective view of the present invention fully assembled and inserted into a printed publication 40. As shown, it could be inserted or bound into the publication adjacent to the standard ordering forms and information usually found in catalogs and sales brochures. As in the FIG. 3, an insert flap 42 provides a means for inserting and binding the invention into catalogs or brochures, etc.

Figure 5:
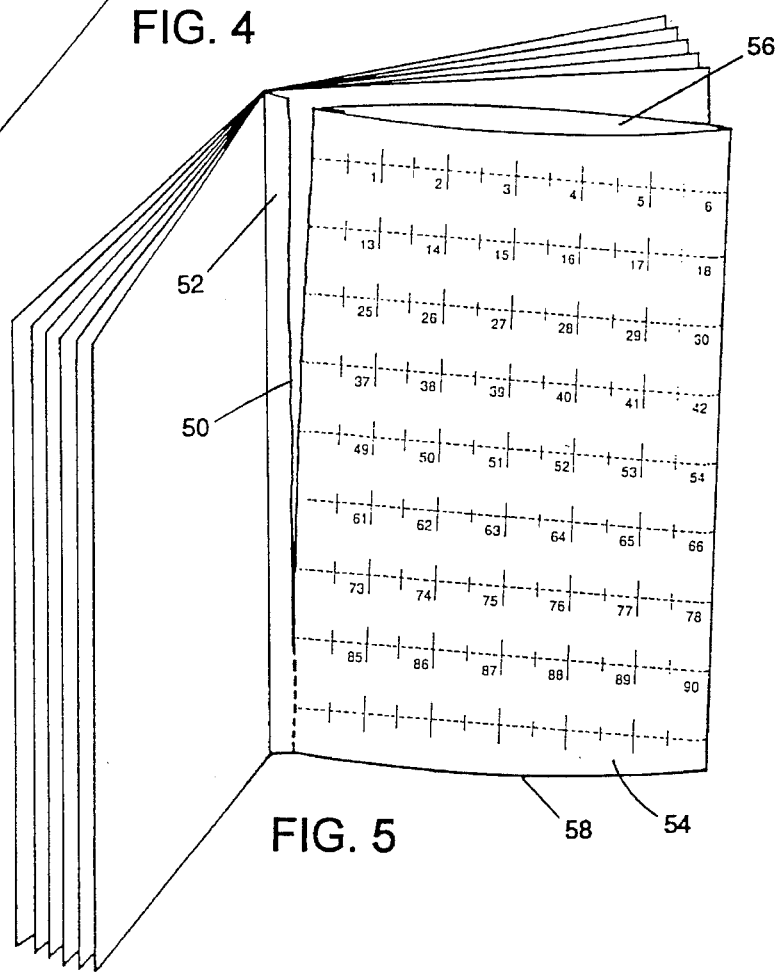
FIG. 5 is a perspective view of the present invention showing the invention removed from the printed publication.

FIG. 5 is a perspective view of the present invention showing the invention removed from the printed publication. A vertical line of separation would lie at 50 along the inside edge of the insert flap 52 adjacent to the attachment flap attached to the inside surface of the printed material. When separated by cutting or along a perforated line of separation, the invention would resemble, in one embodiment, an sealed envelope 54 open at both the top end 56 and the bottom end 58.

Figure 6:
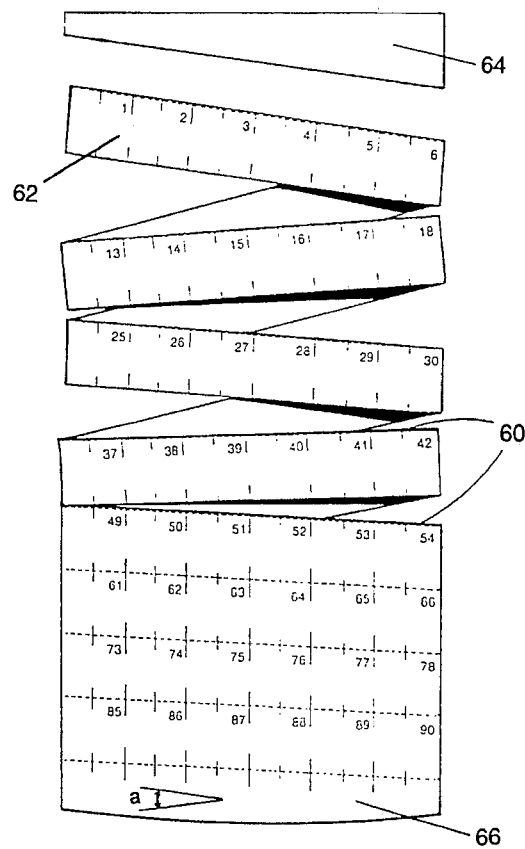
FIG. 6 is a perspective view of the present invention showing the measuring portion partially prepared for use.

FIG. 6 is a perspective view of the present invention showing the measuring portion partially prepared for use. As the perforations in the material allow the material to be pulled apart or the material is cut along the lateral lines of separation 60, an elongated strip 62 having the dimension markings or other markings printed thereon is formed. In one embodiment, an upper wedge shaped portion 64 can be separated from the piece of material and discarded. This upper wedge shaped portion of the printed material would have the same angle a as the angle of the printed dimension markings and lines of separation. There might also be a lower wedge shaped portion 66, produced similarly to the upper wedge shaped portion, which could also be discarded. It will be understood that the drawing shows the invention only partially separated along the lateral lines of separation, for purposes of illustrating the principles of operation.

Figure 7:
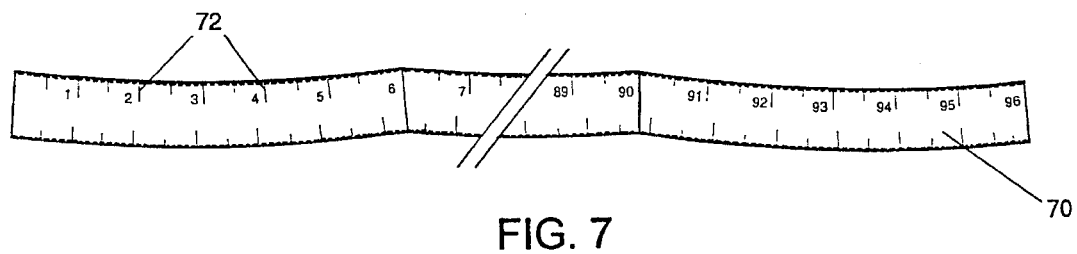
FIG. 7 is a perspective view of the present invention, in partial cut-away, showing the invention as it would ultimately be used.

FIG. 7 is a perspective view of the present invention, in partial cut-away, showing the invention as it would ultimately be used. The elongated measuring tape 70 produced by the printed sheet would be used as such for taking measurements using the printed dimension markings 72 for individual hat sizes, shoe sizes, inseams, arm lengths, collars, hems, etc. In reality, the device can be used to measure anything a standard or other tape measure would be used for, including office or home furniture and supplies, draperies or other home furnishings, mechanical equipment, automotive parts, tools, agricultural needs, landscaping, and instructions and operating manuals for all sorts of devices and services. Furthermore, this type of tape measure is lightweight, can be made to be disposable, and can be made out of any material at all which would be effective and operative. The most compelling features, however, may be it's low cost and ability to be accommodated into printed publications such as mail order catalogs or brochures, thus enabling publishers of these types of materials to provide potential customers of the advertised or described products with a handy, simple, rapid and easy tool to use for obtaining critical dimensions.

While the principles of the invention have been made clear in illustrative embodiments, there will be immediately obvious to those skilled in the art many modifications of structure, arrangement, proportions, the elements, materials, and components used in the practice of the invention, and otherwise, which are particularly adapted to specific environments and operative requirements without departing from those principles. The appended claims are intended to cover and embrace any and all such modifications, with the limits only of the true spirit and scope of the invention.

I claim:

1. A printed sheet measuring device which can be manufactured inexpensively and, optionally, inserted into printed publications for distributing an elongated tape measure, the printed publications each being bound the printed sheet measuring device comprising:

a printed sheet of material, said printed sheet of material forming essentially a continuous loop of material having an outer surface and in inner surface;

a plurality of folds in said printed sheet of material, said folds creating at least a first opposing portion of said printed sheet of material and a second opposing portion of said printed sheet of material, said folds also creating an attachment flap, said attachment flap being contiguous with said first opposing portion of said printed sheet of material and attached to said second opposing portion of said printed sheet of material;

lines of separation indicated on said printed sheet of material, said lines of separation being essentially parallel to each other upon said outer surface of said continuous loop of material such that said lines of separation align themselves along a continuous spiraling path upon said outer surface of said continuous loop of material;

an attachment means, said attachment means attaching said attachment flap to said second opposing portion of said printed sheet of material thereby forming said essentially continuous loop of material: and a set of sequential dimension markings printed upon said outer surface of said printed sheet of material, the sequential dimension markings essentially parallel to and delineated by the lines of separation, whereby upon separation of said printed sheet of material along said lines of separation, a contiguous, elongated tape measure is produced.

2. The invention of claim 1 further comprising an insert flap, said insert flap being defined by a line of separation, the insert flap being contiguous with and extending along the second opposing portion of said printed sheet of material such that said printed sheet measuring device can be inserted conveniently into printed publications by binding the insert flap of the printed sheet measuring device along with or adjacent to the binding of the printed publications.

3. The invention of claim 1 wherein said lines of separation are created by a plurality of printed markings on said printed sheet of material.

4. The invention of claim 1 wherein said lines of separation are created by a plurality of perforations on said printed sheet of material.

5. The invention of claim 1 wherein said dimension markings correspond with predetermined standard, generally accepted measurement dimensions.

6. A method of using a printed sheet measuring device which can be manufactured inexpensively and, optionally, inserted into printed publications for distributing an elongated measuring device, the printed sheet measuring device comprising:

a printed sheet of material fastened together to form essentially a continuous loop of material;

a plurality of folds, the folds creating a first opposing portion, a second opposing portion and an attachment flap portion;

lines of separation indicated on the printed sheet of material along a continuous spiraling path; and sequential dimension markings printed on the outer surface of the printed sheet of material;

the method of using the printed sheet measuring device comprising the following steps:

(a) removing said printed sheet measuring device from its source of distribution, generally a printed publication;

(b) dividing said printed sheet of material along said lines of separation such that a contiguous, elongated measuring device is produced either by cutting said sheet of printed material along said lines of separation or by separating said printed sheet of material along perforated lines of separation; and (c) utilizing said elongated measuring device in a conventional manner.

7. A method of making an elongated measuring device which can be manufactured inexpensively and, optionally, inserted into printed publications for distributing the elongated measuring device, the method of making the elongated measuring device comprising the following steps:

(a) obtaining a sheet of material;

(b) printing thereon, in a predetermined pattern, a set of sequential dimension markings on one side of the sheet of material;

(c) indicating thereon, in a predetermined pattern, lines of separation, the sequential dimension markings essentially parallel to and delineated by the lines of separation;

(d) folding said sheet of material such that said sequential dimension markings are visible and said lines of separation align themselves along a continuous spiral;

(e) providing thereon an attachment flap;

(f) attaching said attachment flap to said folded sheet of material such that a continuous loop of material is created; and (g) separating said sheet of material along said lies of separation, thereby producing an elongated measuring device.

8. The method of claim 7 wherein step (c) consists of printing said lines of separation upon said sheet of material.

9. The method of claim 7 wherein step (c) consists of creating perforations along said lines of separation.

* * * * *